United States Patent [19]

Kimata et al.

[11] Patent Number: 4,684,356
[45] Date of Patent: Aug. 4, 1987

[54] ROLLER BEARING ASSEMBLIES FOR A HOMOKINETIC UNIVERSAL JOINT

[75] Inventors: Kei Kimata, Aichi; Masahiro Kato; Ko Shibata, both of Iwata, all of Japan

[73] Assignee: NTN Toyo Bearing Co., Ltd., Osaka, Japan

[21] Appl. No.: 858,145

[22] Filed: May 1, 1986

[30] Foreign Application Priority Data

Jun. 17, 1985 [JP] Japan ................. 60-132820

[51] Int. Cl.⁴ ........................................... F16D 3/20
[52] U.S. Cl. ................... 464/111; 464/122; 464/167; 464/905
[58] Field of Search ............... 464/111, 120, 122, 162, 464/167, 168, 905

[56] References Cited

U.S. PATENT DOCUMENTS

| | | | |
|---|---|---|---|
| 2,532,754 | 12/1950 | Beck, Sr. ........................ | 464/167 |
| 3,381,497 | 5/1968 | Allen ............................. | 464/122 |
| 4,192,154 | 3/1980 | Nakamura et al. ............... | 464/111 |
| 4,379,706 | 4/1983 | Otsuka et al. .................. | 464/111 |
| 4,490,126 | 12/1984 | Orain ............................. | 464/111 |
| 4,592,735 | 6/1986 | Orain ............................. | 464/111 |

FOREIGN PATENT DOCUMENTS 59-40016  3/1984  Japan ................ 464/111

Primary Examiner—Daniel P. Stodola
Attorney, Agent, or Firm—Armstrong, Nikaido, Marmelstein & Kubovcik

[57] ABSTRACT

A tripod type homokinetic universal joint which comprises an outer member, a tripod member, and bearing assemblies interposed between the outer member and the tripod member. Each bearing assembly has a plurality of rows of rollers adapted to roll on rolling guide surfaces on track grooves formed in the inner wall of the outer member. The rolling guide surface is defined by side faces of the track groove and near-corner portions of the base of the track groove. The side faces are so oblique that the track groove will be narrowed toward its inlet. Whereby the rollers cannot get off the rolling guide surface even if no shoulders are formed on the side faces of the track groove.

4 Claims, 9 Drawing Figures

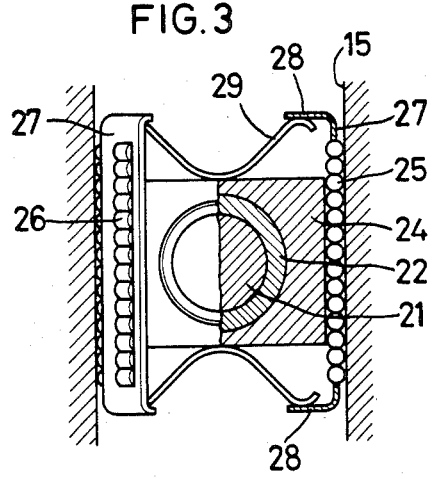
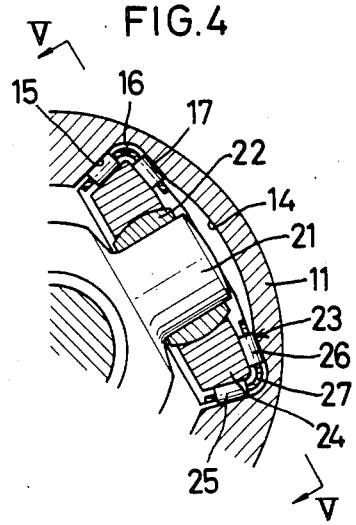
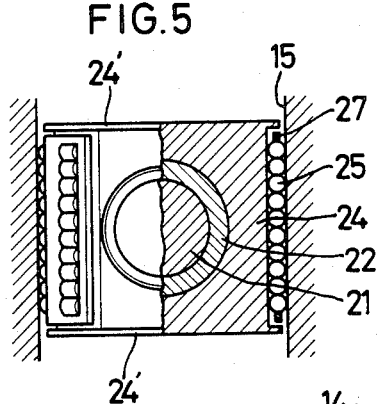
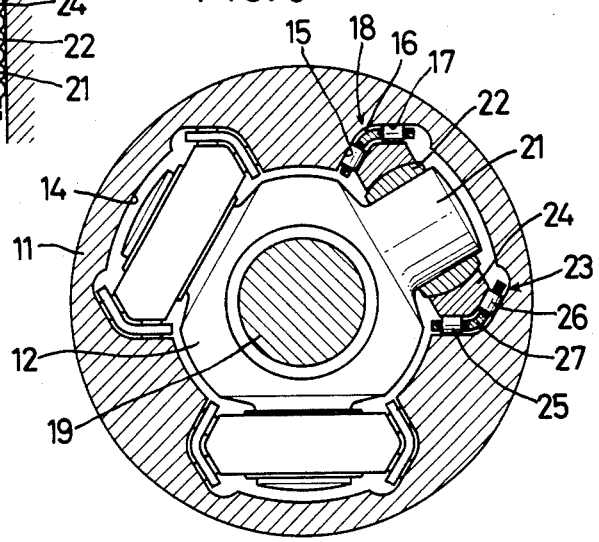

ROLLER BEARING ASSEMBLIES FOR A HOMOKINETIC UNIVERSAL JOINT

The present invention relates to a homokinetic universal joint used mainly for front wheel drive vehicles, and particularly to a tripod type homokinetic universal joint.

It is known that on a homokinetic universal joint of this type, when transmitting the rotation with the input shaft forming an angle with respect to the output shaft, spherical rollers rotatably mounted on the trunnions of the tripod member plunge obliquely with respect to the track grooves formed in the inner wall of the outer ring, so that an axial thrust is produced, causing vibrations or heat buildup.

As one solution for this problem, Japanese Laid-open Patent Publication No. 59-40016 proposed a tripod type homokinetic universal joint in which as shown in FIG. 9, each trunnion 2 of a tripod member 1 is formed to have a spherical surface, a bearing assembly 3 being pivotally mounted on the trunnion 2 and having cylindrical rollers 7 mounted in axially extending guide grooves 6 formed in the side faces of track grooves 5 formed in an outer member 4. In the conventional universal joint, since the bearing assembly 3 is pivotally mounted on the trunnion 2, it can move axially along the guide groove 6 when the input shaft rotates taking some angle with respect to the output shaft. Therefore, the formation of thrust can be prevented. However, in order to form the recessed guide groove 6 in each track groove 5, cutting work is required. Thus, the outer member 4 cannot be manufactured only by cold forging. This structure is not suitable for mass-production. Another problem is that the necessity of forming shoulders 8a and 8b in the side faces of the track groove requires an additional space or thickness in a radial direction. The guide groove 6 has a guiding function to allow the bearing assembly 3 to move in the direction parallel to the axis of the outer member 4. This guiding function is essential for the homokinetic universal joint of this type.

An object of the present invention is to provide a tripod type homokinetic universal joint which has the function of axially guiding the bearing assemblies and yet can be manufactured by cold forging and which is compact in size.

In accordance with the present invention, the rolling guide surface for the bearing assembly is defined by the side faces of the track groove and the near-corner portions of the base of the track groove and that each track groove has such oblique side faces as to be narrowed toward its inlet.

Since the track groove has such oblique side faces, there is no fear of the bearing assembly getting off the track groove. When a relative plunging is formed between the outer member and the tripod member, the bearing assembly can move along the rolling guide surface in the direction of axis of the outer member.

The abovesaid construction obviates the necessity of forming a rolling guide groove in the side faces of each track groove and yet allows the bearing assembly to move in the direction of axis of the outer member. Thus the outer member of the present invention can be mass-produced by cold forging.

In the conventional construction a portion of each side face of the track groove had to be used for the formation of shoulders defining the rolling guide groove. The present invention obviates such a necessity and makes the entire joint more compact.

Further, two rows of rollers are retained by a single retainer and there is no mechanical contact of the retainer with any shoulders unlike in the prior art.

Other objects and advantages of the present invention will become apparent from the following description taken with respect to the accompanying drawings, in which:

FIG. 3 is a sectional view taken along the line III—III of FIG. 2;

FIG. 4 is a sectional view of the second embodiment;

FIG. 5 is a sectional view taken along the line V—V of FIG. 4;

FIG. 6 is a sectional view of the third embodiment;

[First Embodiment]

Figure 1:
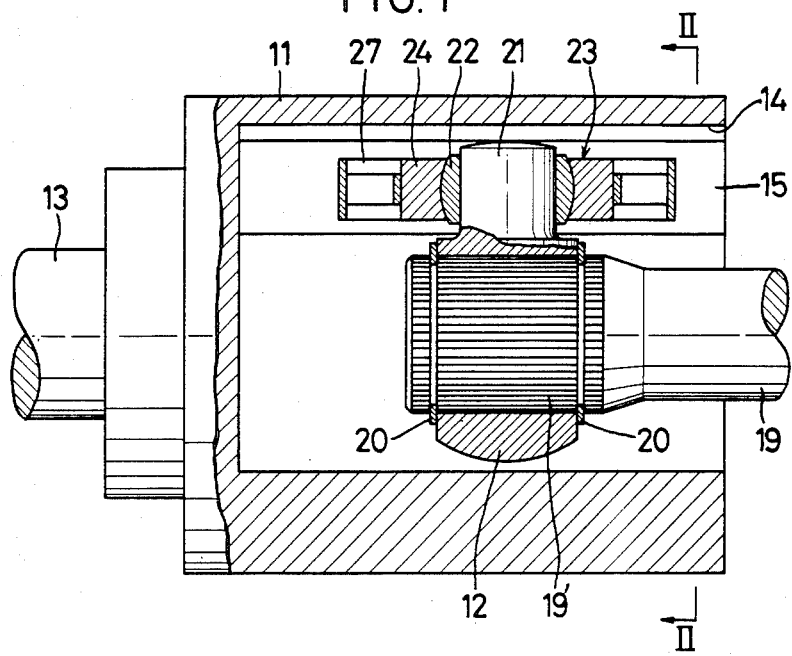
FIG. 1 is a sectional view of the first embodiment of the present invention.
Figure 2:
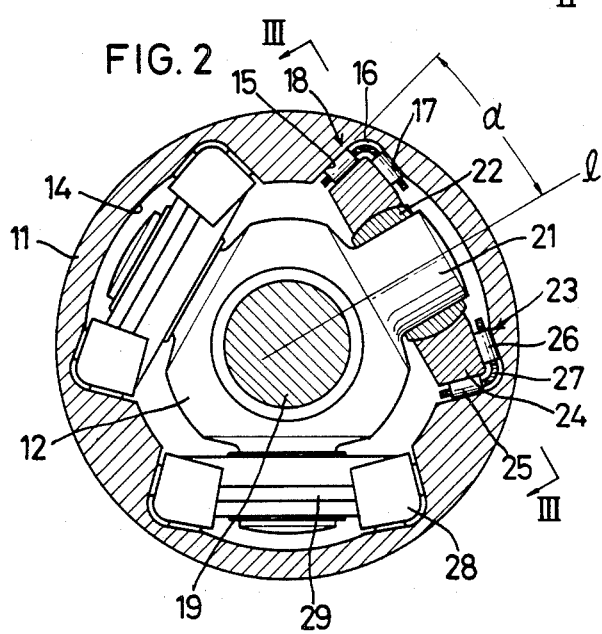
FIG. 2 is a sectional view taken along the line II—II of FIG. 1.

In the first embodiment shown in FIGS. 1 to 3, a tripod member 12 is slidably inserted in an outer member 11, which is integrally provided with a first shaft 13 at its closed end and is formed in its internal surface with three track grooves 14 extending in an axial direction and equally spaced apart 120° around its axis.

The side faces 15 of each track groove 14 are inclined at an angle of $\alpha$ with respect to the center line l of the track groove 14 so that the track groove will be narrowed toward its inlet. Rolling guide surfaces 18 are formed by the side faces 15 and portions 17 of the base of each track groove 14 adjacent to its corners 16. The angle between the side face 15 and the portion 17 is slightly smaller than 90° in this embodiment, but may be slightly larger than that.

The tripod member 12 is mounted on a serration 19' formed on one end of a second shaft 19 and is secured thereto by means of clips 20. The tripod member 12 has three trunnions 21 radially projecting therefrom so as to be received in the track grooves 14 of the outer member 11. A spherical bushing 22 engaged in a block member 24 is slidably mounted on each trunnion 21.

A bearing assembly 23 comprises the block member 24, cylindrical rollers 25 and 26, and retainers 27. The block member 24 in the shape of a substantially square block has an internal surface complementary to the external surface of the spherical bushing 22 so as to be tiltable and pivotable thereround. The side faces and the outer faces of each block member 24 run substantially parallel with the side faces 15 and the portions 17 of the rolling guide surface 18, respectively. The rollers 25 and 26 are interposed between the block member 24 and the side faces 15 and between the block member 24 and the portions 17, respectively. Two rows of the rollers are supported by a single retainer 27 which is bent along the corner 16.

As shown in FIG. 3, a flange 28 is formed at each end of the retainer 27. The retainers 27 disposed at both sides of each track groove 14 are positioned by the resiliency of a pair of leaf springs 29. Both ends of each spring 29 are in abutment with the flanges 28 of the retainers 27, while its middle portion is in abutment with the block member 24. In the alternative, the retainers 27 may be positioned by other means e.g. coil springs.

Since the rollers 25 and 26 are interposed at each side of the corner 16, retained by the retainer 27, they cannot get off the rolling surfaces 18 on the track groove. The bearing assembly 23 moves in the axial direction of the outer member 11, depending on the degree of the relative plunging of the tripod member 12 into the outer member 11. While the first shaft 13 of the outer member 11 forms an angle with the second shaft 19 of the tripod member 12 during rotation, the spherical bushing 22 can pivot in the block member 24 while the trunnion 21 can pivot freely in the spherical bushing 22 so that the eccentric movement of the second shaft 19 will be absorbed.

[Second Embodiment]

In the second embodiment shown in FIGS. 4 and 5, each block member 24 is provided with a flange 24' at its each end. The retainers 27 are disposed between the flanges 24' and are slightly shorter than the space therebetween so as to allow the rollers 25, 26 to roll only for the gap between the flanges and the retainer. Except for this difference, the second embodiment is the same in construction as the first embodiment.

[Third Embodiment]

In the third embodiment shown in FIG. 6, the near-corner portions 17 of the base of each track groove 14 form some angle with the middle portion of the base. Rolling guide surfaces 18 are formed by the near-corner portions 17 and the oblique side faces 15. The outer peripheral surface of the block member 24 has two oblique faces running parallel with the side faces 15 and the near-corner portions 17, respectively, with the rollers 25 and 26 interposed between the block member 24 and the rolling surfaces 18. The rollers 25 and 26 are supported by the retainer 27 which is bent along the corner 16.

This embodiment does not have any springs for positioning the retainers 27. The retainers move as the rollers 25 and 26 roll on the rolling surface 18. Since the travel of the rollers 25 and 26 is not so long, they can not get off the block member 24 even if the springs for positioning are not used.

In the third embodiment, either, the rollers 25 and 26 supported by the retainer 27 can not get off the rolling surface 18, because the rollers 25 are disposed at one side of the corner 16 and the rollers 26 are disposed at the other side thereof. In the same manner as with the first embodiment, the bearing assembly 23 moves in the axial direction of the outer member 11, depending on the relative plunging of the tripod member 12 into the outer member 11, and the eccentric movement of the second shaft 19 is absorbed.

[Fourth Embodiment]

Figure 7:
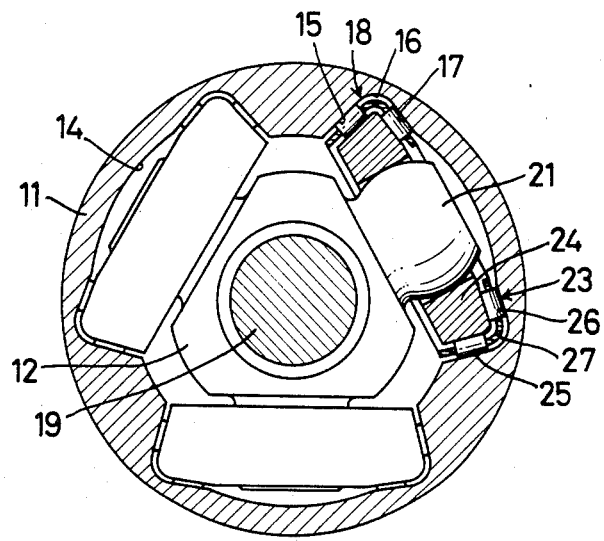
FIG. 7 is a sectional view of the fourth embodiment.

The fourth embodiment shown in FIG. 7 differs from the first embodiment in that each retainer 27 is in such a shape as to surround the square-shaped block member 24 and that each trunnion 21 has a spherical surface while the bore in each block member 24 has a cylindrical inner surface. In other points, the fourth embodiment is the same in construction with the first embodiment.

[Fifth Embodiment]

Figure 8:
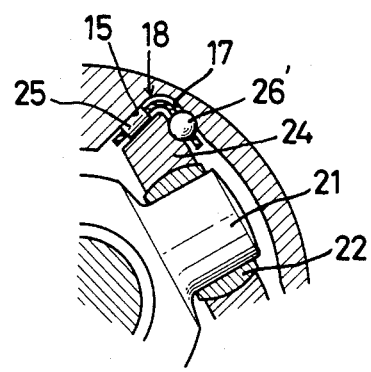
FIG. 8 is a partial sectional view of the fifth embodiment.
Figure 9:
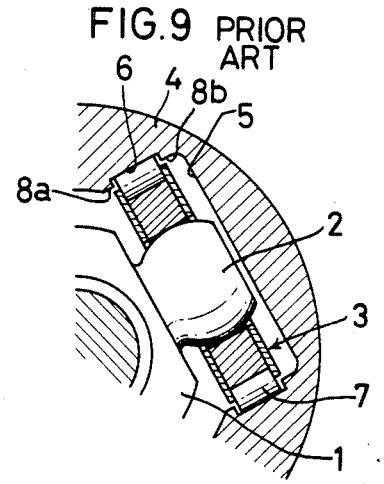
FIG. 9 is a sectional view of a prior art universal joint.

The fifth embodiment shown in FIG. 8 is the same as the first embodiment except that not rollers but steel balls 26' are interposed between the block member 24 and the near-corner portion 17 of the base of each track groove 14.

What we claim:

1. A homokinetic universal joint comprising:
    a tripod member having three trunnions projecting radially and equally angularly spaced around its axis;
    an outer member formed in its inner surface with three track grooves extending axially and equally angularly spaced around its axis;
    said tripod member being disposed in said outer member with said trunnions received in said respective track grooves in said outer member;
    a plurality of bearing assemblies each for said each trunnion on said tripod member, each said bearing assembly comprising a block member mounted on said trunnion so as to be slidable, tiltable and pivotable, two rows of rolling elements mounted at each side of said track groove, and a pair of retainers each for retaining said two rows of rolling elements,
    each of said track grooves having a pair of side faces and a base face, said side faces being inclined so that said track groove will be narrowed toward the inlet thereof, said each track groove being formed at each side thereof with a pair of linear rolling surfaces extending in a direction parallel to the axis of said outer member, one of said rolling surfaces being formed on said side face and the other being formed on said base face near the corner of said track groove;
    said retainer being bent around the corner corresponding to the corner between the side face and the base face of said track groove;
    said rolling elements being adapted to roll between said outer member and said block member on said rolling surfaces on said outer member.

2. A homokinetic universal joint as claimed in claim 1, further comprising a bushing interposed between said each trunnion and said each block member so as to be slidable in the direction of axis of said trunnion.

3. A homokinetic universal joint as claimed in claim 1, wherein all of said rolling elements are cylindrical rollers.

4. A homokinetic universal joint as claimed in claim 1, wherein one row of said rolling elements rolling on the rolling surface formed on said side face are cylindrical rollers whereas the other row of said rolling elements rolling on the rolling surface formed on said base face are balls.

* * * * *